United States Patent
Ellis et al.

(10) Patent No.: US 8,229,632 B2
(45) Date of Patent: Jul. 24, 2012

(54) ENGINE CONTROL SYSTEM AND METHOD

(75) Inventors: Nathaniel Ellis, Marysville, OH (US); Hirokazu Toyoshima, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 511 days.

(21) Appl. No.: 12/480,362

(22) Filed: Jun. 8, 2009

(65) Prior Publication Data

US 2010/0312440 A1    Dec. 9, 2010

(51) Int. Cl.
*G06F 7/00* (2006.01)

(52) U.S. Cl. ............ 701/54; 701/51; 701/103; 123/493

(58) Field of Classification Search .............. 701/51, 701/54, 103, 104; 123/493; 180/65.265
See application file for complete search history.

(56) References Cited

U.S. PATENT DOCUMENTS

| 5,569,115 A | 10/1996 | Desaultels et al. |
| 5,638,271 A | 6/1997 | White et al. |
| 7,214,162 B2 | 5/2007 | Shimada |
| 2005/0049111 A1* | 3/2005 | Takada et al. ............... 477/107 |

FOREIGN PATENT DOCUMENTS

EP   1 209 015 A2   5/2002

* cited by examiner

*Primary Examiner* — Gertrude Arthur Jeanglaude
(74) *Attorney, Agent, or Firm* — Rankin Hill & Clark LLP

(57) ABSTRACT

An engine control system for preventing automatic increasing of an engine speed above a threshold engine speed when increasing engine speed toward an elevated transmission mainshaft speed during a transmission downshift includes a downshift sensor for detecting a transmission downshift in a manual transmission and an electronic control unit (ECU) operatively connected to the downshift sensor for receiving a downshift signal therefrom indicative of the transmission downshift. The ECU automatically increases the engine speed toward a transmission mainshaft speed when the downshift sensor detects a transmission downshift. The ECU limits the increasing of the engine speed to an engine target speed that is below the threshold engine speed.

21 Claims, 3 Drawing Sheets

ENGINE CONTROL SYSTEM AND METHOD

BACKGROUND

The present disclosure relates generally to an engine control system and method, and particularly relates to an engine control system and method that prevents or limits automatic increasing of engine speed during a downshift of a manual transmission.

It is known to match engine speed to transmission input shaft speed upon detection of a downshift in a manual transmission. An output shaft of the engine is typically selectively connected to the main or input shaft of a transmission through a clutch. The transmission input shaft is connected to a transmission output shaft through a series of gears having gear ratios and the output shaft is connected to the vehicle's wheels, such as through a differential or similar arrangement. Gear changes of the transmission can be actuated through a shift lever.

In a known system, a vehicle's electronic control unit (ECU) is able to determine which gear the transmission is in through a sensor on the transmission input shaft and another sensor on the transmission output shaft. In particular, these sensors indicate the speeds at which the input and output shafts are rotating, and, by comparing the rotational speeds of the two shafts, the selected gear for transmission can be determined, provided the transmission is not in neutral. An engine speed sensor monitors engine speed and a neutral sensor indicates when the transmission is in neutral. Upon detection of a downshift, the ECU operates to control engine speed, such as by management of the engine's throttle or other torque application (e.g., integrated motor assist or IMA). Specifically, the ECU can attempt to match engine speed with transmission input shaft speed during and/or after a downshift. Such assistance during downshifting of a manual transmission is able to simulate "heel-toe" driving, which has the advantage of offering more power as a vehicle exits a curve and/or reduces the likelihood of a vehicle "jumping" upon engagement of the clutch after a downshift.

During downshifting of the manual transmission, it is possible to select a gear of the transmission that increases the transmission input shaft speed to a speed over which the engine is rated to operate. In this event, when the clutch reconnects the engine output shaft and the transmission input shaft, engine damage is possible depending on the length of time that the engine is overreved and/or the amount that the engine is overreved. When the engine speed is automatically increased during downshifting of the manual transmission as described above, damage to the engine can occur because its speed might be increased above a maximum speed at which the engine is rated to operate. In addition, there is less time after the clutch engages until the engine reaches a speed at which it might be compromised.

BRIEF DESCRIPTION

In accordance with one aspect, an engine control method is provided for preventing automatic increasing of an engine speed of an internal combustion engine above a threshold engine speed during a downshift. The method includes detecting a transmission downshift, automatically increasing the engine speed toward a transmission mainshaft speed when the downshift is detected, and limiting the increasing of the engine speed to an engine target speed that is below the threshold engine speed.

According to another aspect, an engine control system is provided for preventing automatic increasing of an engine speed above a threshold engine speed when increasing engine speed toward an elevated transmission mainshaft speed during a transmission downshift. More particularly, in accordance with this aspect, the system includes a downshift sensor for detecting a transmission downshift in a manual transmission and an electronic control unit operatively connected to the downshift sensor for receiving a downshift signal therefrom indicative of the transmission downshift. The electronic control unit is configured to automatically increase an output shaft speed of an internal combustion engine connected to the manual transmission when the electronic control unit receives the downshift signal. The electronic control unit is further configured to limit the output shaft speed of the internal combustion engine to an engine target speed that is below the threshold engine speed of the internal combustion engine.

According to still another aspect, an engine control method is provided for maintaining an engine overrev margin during a downshift event. More particularly, in accordance with this aspect, the method includes detecting the downshift event and automatically increasing engine speed toward a target engine speed during the detected downshift event. The engine target speed is set at a predetermined amount below the engine speed limit when a transmission mainshaft speed is above the engine speed limit. The engine target speed is set equal to the transmission mainshaft speed when the transmission mainshaft speed is at or below the engine speed limit.

According to a further aspect, an engine control system and method decreases an overrev margin by automatically raising engine speed while a clutch pedal is depressed. If a target engine speed is above the operating range of the engine, only the engine fuel cut speed limiter will limit the engine speed so that the engine speed will be raised to exactly the engine speed limit. If the transmission mainshaft speed is above the limit and the clutch pedal is released, a mechanical engine overrev condition will exist. By placing an artificial limit to the target engine speed when increasing engine speed during a downshift event and during the time when the mainshaft speed is above the maximum engine operating speed, the driver is still able to realize he or she is about to overrev the engine when the clutch is reengaged.

DETAILED DESCRIPTION

Figure 1:
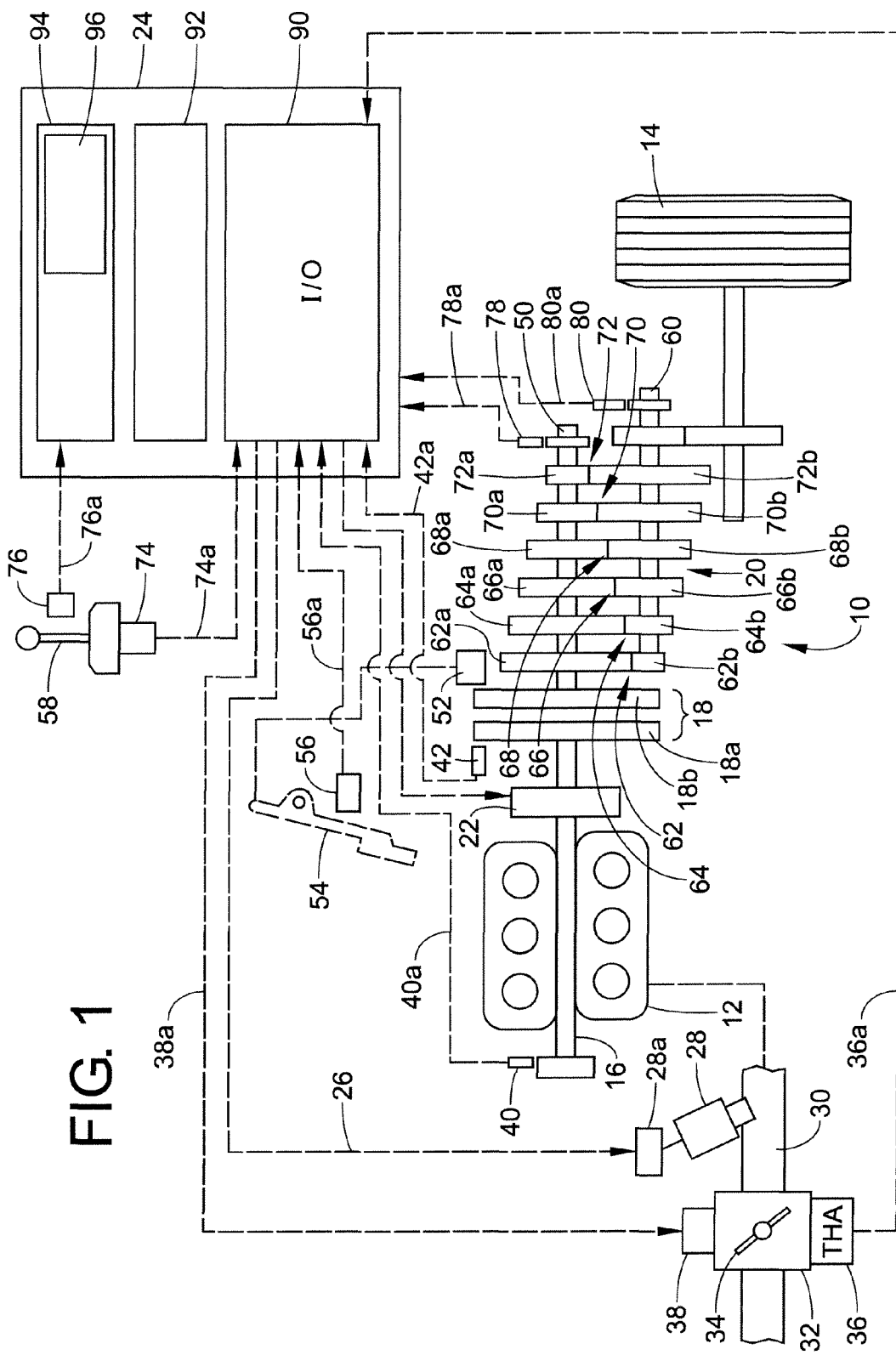
FIG. 1 schematically illustrates an engine control system for preventing automatic increasing of an engine speed above a threshold engine speed when increasing engine speed toward an elevated transmission mainshaft speed during a transmission downshift.

Referring now to the drawings, wherein the showings are only for purposes of illustrating one or more exemplary embodiments and not for purposes of limiting same, FIG. 1 schematically illustrates an engine control system 10 for preventing automatic increasing of an engine speed (NE) above a threshold engine speed (NE_LIMIT) when increasing engine speed toward an elevated transmission mainshaft speed (NMNE) during a manual transmission downshift. The system 10 includes an internal combustion engine 12 that produces power to be transmitted to one or more wheels 14 of a vehicle. By way of example, the engine 12 can be a V-type DOHC gasoline engine or some other type of engine, and/or can have any number of cylinders while still advantageously incorporating the features of the present disclosure. In particular, power from the engine 12 is transmitted to the one or more wheels 14 through an engine output shaft 16, a clutch 18, a manual transmission 20, and optionally a differential gear mechanism (not shown).

Optionally, the engine control system 10 can include an alternate or supplemental power plant for providing power to the one or more wheels 14. By way of example, the alternate or supplemental power plant could be an integrated motor assist (IMA) system having an electric motor 22, also referred to herein as an IMA motor, disposed between the engine 12 and the transmission 20, particularly between the engine 12 and the clutch 18 in the illustrated embodiment. The IMA motor 22 can be used to supplement or replace power delivered by the engine 12 to the output shaft 16.

The system 10 can additionally include an electronic control unit (ECU) 24 operatively linked to the engine 12 for control thereof. Fuel delivery to the engine 12 is controlled by the ECU 24. In particular, the ECU 24 can send a command signal or signals 26, which cause fuel injectors 28 (only one shown) to cut or cease delivery of fuel to the engine 12. More particularly, in one exemplary embodiment, the ECU 24 directs an injector driver 28a to vary an output voltage that normally drives the fuel injector 28 and thereby cuts fuel to the engine 12 as appropriate. In addition, when included in the system 10, the ECU 24 can operate the IMA motor 22.

Intake manifold 30 is operatively connected to the engine 12 for delivering combustion air thereto. A throttle or throttle body 32 is provided upstream of the intake manifold 30 for controlling air flow delivered to the engine 12. A throttle valve 34 can be rotatably disposed within the throttle body 32 for regulating air flow into the engine 12 as the throttle valve 34 is angularly moved. A degree of opening of the throttle valve 34 can be sensed by throttle valve opening sensor 36 and communicated as a signal 36a indicative of the sensed throttle valve opening amount (THA) to the ECU 24 via a link therewith. A throttle body controller 38 is linked to the ECU 24 for receiving an open command signal 38a therefrom. The throttle body controller 38 is configured to move the throttle valve 34 to a desired position based on the command signal 38a received from the ECU 24. As used herein, a link or being linked is being used broadly to cover any operative connection between components of the system 10 whether wired or wireless that enables the linked components to communicate (e.g., transmit a signal from one component to another).

The system 10 can additionally employ one or more further sensors for sensing various operating conditions of the engine 12 and communicating the sensed conditions as signals to the ECU 24. For example, one or more engine speed (NE) sensors 40, 42 can be disposed on or adjacent the engine output shaft 16 for measuring engine speed (NE) by monitoring rotation of the engine output shaft 16. The sensors 40, 42 can be linked to the ECU 24 so the measured engine speed (NE) can be communicated as one or more signals 40a, 42a indicative of the engine speed.

As shown, the clutch 18 includes a clutch plate 18a coupled to the engine output shaft 16 and a clutch plate 18b coupled to an input shaft 50 of the transmission 20 and selectively pairing or coupling with the clutch plate 18a. A clutch driving actuator 52 is provided on the clutch 18. The clutch driving actuator 52 is operatively connected to clutch pedal 54. As is known and understood by those skilled in the art, the clutch driving actuator 52 couples the clutch plates 18a and 18b when clutch pedal 54 is depressed a certain amount or beyond a predetermined distance. A clutch sensor can be provided for detecting whether the clutch 18 is engaged and/or disengaged. In the illustrated embodiment, the clutch sensor is a clutch pedal sensor 56 that detects when the clutch pedal 54 is depressed beyond a predetermined amount. The clutch pedal sensor 56 can be linked or operatively connected to the ECU 24 so that clutch pedal depression can be communicated as a signal 56a to the ECU 24 indicative of actuation of the clutch pedal 54. Moreover, depression of the clutch pedal 54 as measured by the clutch pedal sensor 56 can be used to indicate when the clutch plates 18a and 18b are coupled (i.e., the clutched is engaged).

In the illustrated embodiment, the transmission 20 is a manual transmission in which gears of the transmission are selectively engaged through a gear shift lever 58 as is known and understood by those skilled in the art. The transmission 20 comprises the input shaft 50, which is a mainshaft, an output shaft 60, which is a counter shaft, pairs 62, 64, 66, 68, 70, 72 of forward first to sixth speed gears, a reverse gear shaft, and a reverse gear train (the latter two not shown). In the illustrated embodiment, the input shaft 50 and the output shaft 60 are disposed in parallel to each other, and the non-illustrated reverse gear shaft can also be disposed in parallel with these two shafts 50, 60. The forward first to six speed gears are constituted by input side forward first to sixth speed gears 62a, 64a, 66a, 68a, 70a, 72a, which are mounted on the input shaft 50, and output side forward first to sixth speed gears 62b, 64b, 66b, 68b, 70b, 72b, which are mounted on the output shaft 60. As is known and understood by those skilled in the art, the gears constituting the pairs are normally meshed with each other and the respective pairs of forward first to sixth speed gears are set to have different gear ratios.

One or more sensors 74, 76 can be associated with the gear shift lever 58. In particular, neutral sensor 74 can detect when the shift lever 58 is in the neutral position and communicate a neutral indication signal 74a to the ECU 24. Gear position sensor 76 can be arranged, e.g., at a location facing the shift lever 58, for detecting the gear position (NGR) of the manual transmission 20. The ECU 24 is operatively connected to the sensors 74, 76 for receiving signals therefrom (e.g., a downshift signal indicative of a transmission downshift). In the six-speed transmission 20, sensor 76 detects a gear position currently selected within a range of the first speed position to the sixth speed position and supplies an electric signal NGR 76a indicative of the sensed position to the ECU 24. The sensor 76 can function as a downshift sensor for detecting a transmission downshift in the manual transmission 20.

Further sensors of the system 10 can include a transmission mainshaft speed (NMNE) sensor 78 for detecting a rotational speed of the mainshaft 50 of the manual transmission 20. The ECU 24 can be linked or operatively connected to the sensor 78 for receiving a transmission mainshaft speed signal 78a therefrom indicative of a rotational speed of the mainshaft 50. The system 10 can additionally include a countershaft speed sensor 80 for detecting a rotational speed of the countershaft 60 of the transmission 20. The ECU 24 can be linked or operatively connected to the sensor 80 for receiving a countershaft speed signal 80a therefrom indicative of a rotational speed of the countershaft 60.

The ECU 24 can include an input/output interface 90 for sending and receiving signals with the various components of the system 10, including controllers (e.g., throttle controller 38), sensors (e.g., throttle valve opening sensor 36, engine speed sensors 40 and 42, clutch pedal sensor 56, gear shift lever sensors 74 and 76, shaft sensors 78 and 80, etc.), the fuel injectors 28 or injector drivers 28a, the IMA motor 22, etc. Although not illustrated, the input/output interface 90 can include an input circuit having various functions including the function of shaping the waveforms of input signals from the various sensors, a function of correcting the voltage of the input signals to a predetermined level, and a function of converting analog signal values into digital signal values. The input/output interface 90 can also include an output circuit for supplying drive signals to various components of the system 10, such as the fuel injection valves 28, the drivers 28a therefor, etc., and the throttle controller 38. The ECU 24 can additionally include a central processing unit (CPU) 92 linked to the input/output interface 90 and linked to a memory or memory circuit 94 including a ROM, which can preliminarily store various operational programs to be executed by the CPU 92, and a RAM for storing the results of computations or the like by the CPU 92. The ECU 24, and particularly the memory 94 thereof, can include an engine target speed (TARGET_NE) look-up table 96, which will be described in further detail below.

As will also be described in more detail below, ECU 24 can be configured to automatically increase the output shaft speed (NE) of the engine 12, particularly of the output shaft 16 connected to the manual transmission 20, when the ECU 24 receives a downshift signal (e.g., signal 76a) indicating that a downshift is occurring in the transmission 20. The ECU 24 can be specifically configured to automatically increase the output shaft speed (NE) to the engine target speed (NE_TARGET) only when clutch signal 56a is received indicating depression of the clutch pedal 54, which is indicative of the clutch 18 being disengaged. The ECU 24 can be further configured to limit the output shaft speed (NE) of the engine 12, and particularly of the output shaft 16 thereof, to an engine target speed (TARGET_NE), which can be looked-up from the table 96, that is below a threshold engine speed (NE_LIMIT) of the engine 12. The threshold engine speed (NE_LIMIT) can be, for example, a speed related to a particular gear of the transmission 20 above which the engine 12 could potentially be damaged depending on the duration that the engine 12 is run above the threshold engine speed, the degree to which the engine 12 is run above the threshold speed, etc. In particular, the ECU 24 can be configured to limit the output shaft speed (NE) to the engine target speed (TARGET_NE) that is below the threshold engine speed (NE_LIMIT) only when the rotational speed (NMNE) of the mainshaft 50 exceeds the threshold engine speed (NE_LIMIT).

The ECU 24 can also be configured to set the target engine speed (TARGET_NE) to equal the transmission mainshaft speed (NMNE) when the transmission mainshaft speed is less than or equal to the threshold engine speed (NE_LIMIT) (i.e., when the rotational speed (NMNE) of the mainshaft 50 does not exceed the threshold engine speed). Specifically, the ECU 24 can be configured to automatically increase the output shaft speed (NE) of the engine output shaft 16, such as by commanding the throttle valve 34 to open a desired amount or by controlling the IMA motor 22, and can be further configured to limit the output shaft speed (NE) of the shaft 16, such as by commanding the fuel injector 28 to cut fuel to the engine 12 (e.g., by commanding the fuel injector driver 28a to vary voltage to the injector 28 to thereby limit fuel discharged therefrom).

Figure 2:
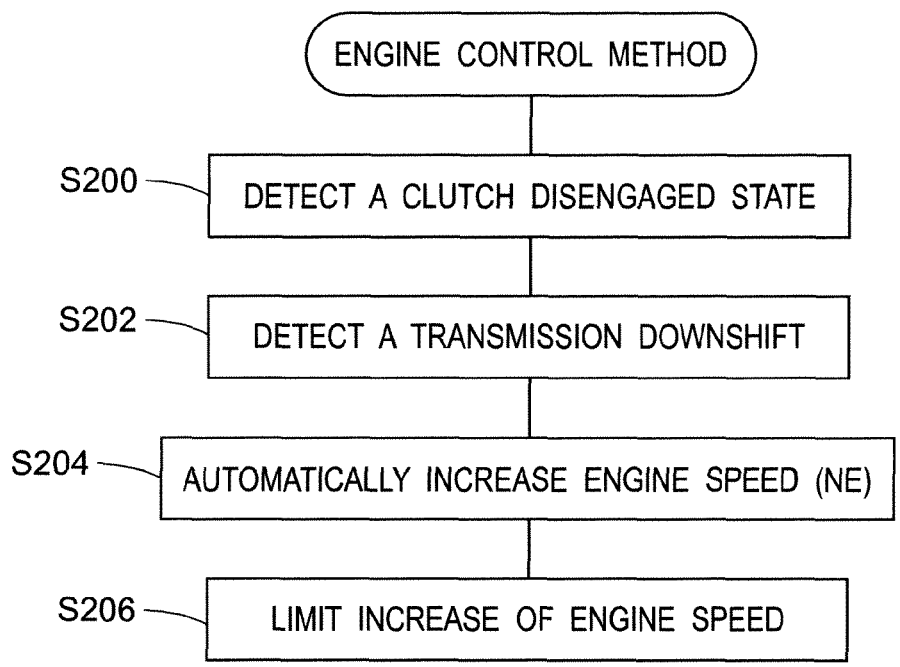
FIG. 2 is a block diagram showing an engine control method for preventing automatic increasing of engine speed above a threshold engine speed during a downshift.

With additional reference to FIG. 2, an engine control method is shown according to one exemplary embodiment for preventing automatic increasing of engine speed (NE) of an engine (e.g., engine 12) above a threshold engine speed (NE_LIMIT) during a downshift, and particularly for maintaining an engine overrev margin during a downshift event. In S200, whether clutch 18 is disengaged is detected. In an exemplary embodiment, detecting whether the clutch is disengaged in S200 includes using a position of the clutch pedal 54 as determined by the clutch pedal sensor 56 to indicate when the clutch 18 is disengaged. In particular, when the sensor 56 indicates that the clutch pedal 54 is depressed beyond a predetermined amount, it is determined that the clutch 18 is disengaged (i.e., clutch plate 18a is disengaged from clutch plate 18b) as effected by the clutch driving actuator 52.

In S202, a transmission downshift or downshift event is detected. This can be determined by the sensor 76. In particular, the sensor 76 can detect downshifting of the shift lever 58 and relay detection of such downshifting via signal 76a to the ECU 24. When a transmission downshift is detected in S202 and the clutch is determined to be in a disengaged state in S200, the engine speed (NE) of the engine 12, and particularly of the engine output shaft 16, can be automatically increased toward the transmission mainshaft speed (NMNE) of the transmission mainshaft 50, and particularly automatically increased toward a target engine speed (TARGET_NE) during the detected downshift event (S204). Thus, automatically increasing the engine speed (NE) of the shaft 16 in S204 occurs only when the clutch is disengaged as determined in S200 and a transmission downshift is detected in S202. In the illustrated method, the increasing of the engine speed (NE) in S204 is limited in S206 to increasing of the engine speed (NE) to the engine target speed (TARGET_NE) that is below the threshold engine speed (NE_LIMIT).

Figure 3:
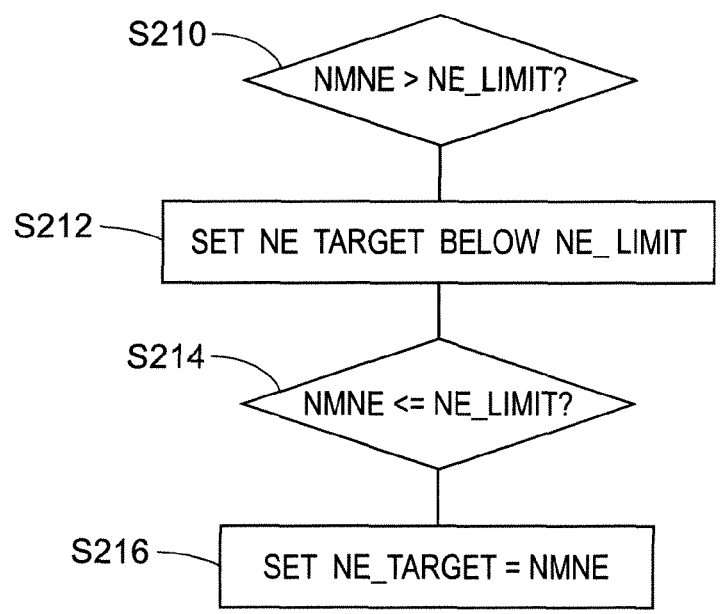
FIG. 3 is a block diagram showing a process for limiting an increase in engine speed in the method of FIG. 2.

With additional reference to FIG. 3, one exemplary method for limiting engine speed in S206 is illustrated. Specifically, in S210 a determination is made as to whether transmission mainshaft speed (NMNE) of the transmission mainshaft 50 is greater than the threshold engine speed (NE_LIMIT). This determination is made by the ECU 24 based on the transmission mainshaft speed (NMNE) as determined by the sensor 78 and communicated to the ECU 24 via signal 78a. The threshold engine speed (NE_LIMIT) can be stored in the memory 94 of the ECU 24. When determined that the transmission mainshaft speed (NMNE) is above the threshold engine speed (NE_LIMIT), also referred to herein as the engine speed limit, the engine target speed (TARGET_NE) is set at a predetermined amount below the engine threshold speed (NE_LIMIT) in S212. If transmission mainshaft speed (NMNE) is not greater than the engine threshold speed (NE_LIMIT) in S210, then transmission mainshaft speed (NMNE) is determined to be less than or equal to the engine threshold speed (NE_LIMIT) in S214. When the transmission mainshaft speed (NMNE) is at or below the engine threshold speed (NE_LIMIT), the engine target speed (TARGET_NE) is set to equal the transmission mainshaft speed (NMNE) in S216. By S210-S216, limiting of the increase of engine speed (NE) to the engine target speed (TARGET_NE) occurs only while the transmission mainshaft speed (NMNE) is at or above the threshold engine speed (NE_LIMIT). Accordingly, the target engine speed (TARGET_NE) can be set in S212 to be below the engine threshold speed (NE_LIMIT) while the transmission mainshaft speed (NMNE) is greater than the engine threshold speed (NE_LIMIT); however, the target engine speed (TARGET_NE) can be modified to equal the transmission mainshaft speed (NMNE) in S216 as soon as the transmission mainshaft speed (NMNE) falls to or below the engine threshold speed (NE_LIMIT).

The predetermined amount that the engine target speed (TARGET_NE) is set below the engine threshold speed (NE_LIMIT) in S212 can be an amount sufficient to maintain a margin between the engine target speed (TARGET_NE) and the engine threshold speed (NE_LIMIT) that indicates to a driver that an overrev condition will occur when the transmission mainshaft 50 is re-engaged to the engine output shaft 16 through the clutch 18. The specific amount can correlate to whichever gear the transmission 20 is in and can be stored in the look-up table 96 stored in the memory 94 of the ECU 24. In one embodiment, automatically increasing of the engine speed (NE) in S204 can include opening the throttle valve 34 of the engine 12 a desired or corresponding amount as commanded by the ECU 24 and limiting the increase of the engine speed (NE) in S206 can include cutting fuel to the engine 12 via the ECU 24 commanding the controller 28a to vary output voltage to the injectors 28. In addition, or in the alternative, automatically increasing the engine speed (NE) or the speed of the output shaft 16 in S206 can include commanding the IMA motor 22 to deliver rotational power to the shaft 16.

Figure 4:
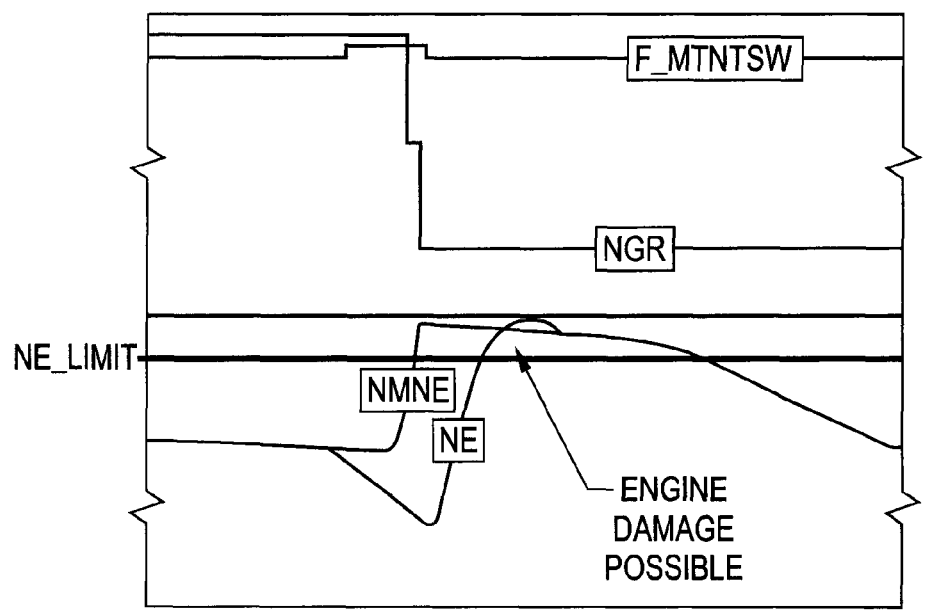
FIG. 4 is a timing diagram showing that automatic increasing of engine speed toward or to a transmission mainshaft speed during a manual transmission downshift without employing the control method of FIG. 2 can lead to possible engine damage.
Figure 5:
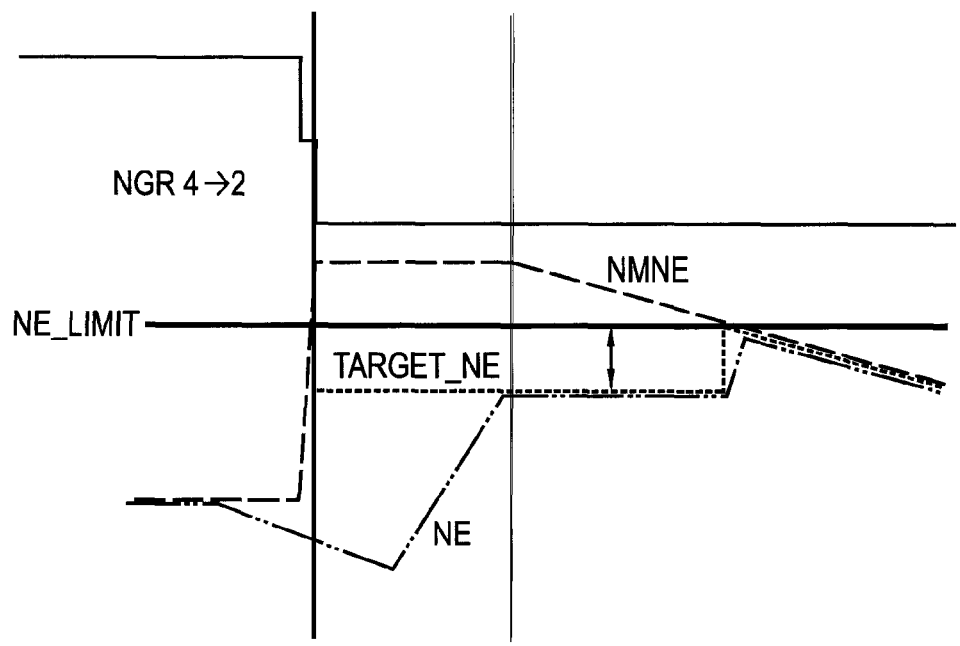
FIG. 5 is a partial timing diagram illustrating the engine target speed being set below the threshold engine speed to limit automatic increasing of the engine speed during a manual transmission downshift.

With reference to FIGS. 4 and 5, timing diagrams are shown for automatic increases in engine speed during transmission downshift events. In particular, a timing diagram is shown in FIG. 4 for a vehicle that automatically increases engine speed (NE) toward transmission mainshaft speed (NMNE) when a transmission downshift is detected, but does not limit the increasing of the engine speed (NE) to a target speed (TARGET_NE) that is below the threshold engine speed (NE_LIMIT). The downshift event can be communicated to the ECU 24 by the neutral sensor 74 of the system 10 sending signal 74a (F_MTNTSW) to the ECU 24 and gear shift lever sensor 76 sending signal 76a (NGR) to the ECU 24. The particular example illustrations provided in FIGS. 4 and 5 are for a transmission downshift wherein a transmission is downshifted from a forward fourth gear to a forward second gear. As shown, engine speed (NE) exceeds an engine threshold speed (NE_LIMIT) when engine speed (NE) is increased toward the mainshaft speed (NMNE) while the mainshaft speed is above the engine threshold limit (NE_LIMIT). In contrast, as shown in FIG. 5, using the method illustrated in FIGS. 2 and 3, the increase in engine speed (NE) toward the transmission mainshaft speed (NMNE) is limited to a target engine speed (TARGET_NE) while the transmission mainshaft speed (NMNE) is above the engine threshold speed (NE_LIMIT). As soon as the transmission mainshaft speed (NMNE) falls to a level at or below the engine threshold speed (NE_LIMIT), the target engine (TARGET_NE) is set to equal the transmission mainshaft speed (NMNE).

The exemplary embodiment(s) have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An engine control method for preventing automatic increasing of an engine speed (NE) of an internal combustion engine above a threshold engine speed (NE_LIMIT) during a downshift, comprising:
   detecting a transmission downshift;
   automatically increasing said engine speed (NE) toward a transmission mainshaft speed (NMNE) when said downshift is detected; and
   limiting said increasing of said engine speed (NE) to an engine target speed (TARGET_NE) that is below said threshold engine speed (NE_LIMIT).

2. The engine control method of claim 1 wherein said limiting said increasing of said engine speed (NE) to said engine target speed (TARGET_NE) occurs only while said transmission mainshaft speed (NMNE) is at or above the threshold engine speed (NE_LIMIT).

3. The engine control method of claim 2 further including:
   setting said engine target speed (TARGET_NE) to equal said transmission mainshaft speed (NMNE) when said transmission mainshaft speed (NMNE) is equal to or below said threshold engine speed (NE_LIMIT).

4. The engine control method of claim 1 further including:
   detecting whether a clutch is disengaged, said automatically increasing said engine speed (NE) occurring only while said clutch is disengaged.

5. The engine control method of claim 4 wherein said detecting of whether said clutch is disengaged includes using a position of a clutch pedal operatively connected to said clutch to indicate when said clutch is disengaged.

6. The engine control method of claim 1 wherein said automatically increasing of said engine speed (NE) includes commanding an IMA motor to deliver rotational power.

7. The engine control method of claim 6 wherein said automatically increasing of said engine speed (NE) includes opening a throttle of the internal combustion engine and said limiting said increasing of said engine speed (NE) includes cutting fuel to the internal combustion engine.

8. The engine control method of claim 1 wherein said engine target speed (TARGET_NE) that is below said threshold engine speed (NE_LIMIT) is sufficiently below said threshold engine speed (NE_LIMIT) to indicate that an over-rev condition will occur after a clutch is re-engaged after said transmission downshift.

9. An engine control system for preventing automatic increasing of an engine speed (NE) above a threshold engine speed (NE_LIMIT) when increasing engine speed (NE) toward an elevated transmission mainshaft speed (NMNE) during a transmission downshift, the system comprising:
   a downshift sensor for detecting a transmission downshift in a manual transmission;
   an electronic control unit operatively connected to said downshift sensor for receiving a downshift signal therefrom indicative of said transmission downshift, said electronic control unit configured to automatically increase an output shaft speed (NE) of an internal combustion engine connected to said manual transmission when said electronic control unit receives said downshift signal, said electronic control unit further configured to limit said output shaft speed (NE) of said internal combustion engine to an engine target speed (TARGET_NE) that is below said threshold engine speed (NE_LIMIT) of said internal combustion engine.

10. The engine control system of claim 9 further including:
   a transmission mainshaft speed (NMNE) sensor for detecting a rotational speed of a mainshaft of said manual transmission, said ECU operatively connected to said transmission mainshaft speed sensor for receiving a transmission mainshaft speed signal indicative of a rotational speed of said mainshaft, wherein said ECU is configured to limit said output shaft speed (NE) to said engine target speed (TARGET_NE) that is below said threshold engine speed (NE_LIMIT) only when said rotational speed (NMNE) of said mainshaft exceeds said threshold engine speed (NE_LIMIT).

11. The engine control system of claim 9 further including:
   a clutch sensor for detecting whether a clutch of said manual transmission is disengaged, said ECU operatively connected to said clutch sensor for receiving a clutch signal indicative of said clutch being disengaged, wherein said ECU is configured to automatically increase said output shaft speed (NE) to said engine target speed (NE _TARGET) when said clutch signal is received.

12. The engine control system of claim 11 wherein said clutch sensor is a clutch pedal sensor that detects when a clutch pedal is depressed beyond a predetermined amount, said clutch pedal operatively connected to said clutch for operation thereof.

13. The engine control system of claim 9 further including:
   a throttle operatively connected to said internal combustion engine for controlling airflow thereinto;
   a fuel injector operatively connected to said internal combustion engine for controlling fuel flow thereto;
   wherein said ECU is configured to automatically increase said output shaft speed (NE) by commanding said throttle to open a desired amount, and further configured to limit said output shaft speed (NE) by commanding said fuel injector to cut fuel to said internal combustion engine.

14. The engine control system of claim 9 further including:
an IMA motor operatively connected to an output shaft of said internal combustion engine, wherein said ECU is configured to automatically increase said output shaft speed (NE) by commanding said IMA motor to deliver rotational power to said output shaft.

15. The engine control system of claim 9 further including:
an engine speed sensor for detecting a rotational speed of said engine output shaft, said ECU operatively connected to said engine speed sensor for receiving an engine speed signal therefrom indicative of said rotational speed of said engine output shaft.

16. The engine control system of claim 9 wherein said ECU is configured to set said target engine speed (TARGET_NE) to equal said transmission mainshaft speed (NMNE) when said transmission mainshaft speed (NMNE) is less than or equal to said threshold engine speed (NE_LIMIT).

17. An engine control method for maintaining an engine overrev margin during a downshift event, comprising:
 detecting the downshift event;
 automatically increasing engine speed (NE) toward a target engine speed (TARGET_NE) during the detected downshift event;
 setting said engine target speed (TARGET_NE) at a predetermined amount below an engine speed limit (NE_LIMIT) when a transmission mainshaft speed (NMNE) is above said engine speed limit (NE_LIMIT); and
 setting said engine target speed (TARGET_NE) equal to said transmission mainshaft speed (NMNE) when said transmission mainshaft speed (NMNE) is at or below said engine speed limit (NE_LIMIT).

18. The engine control method of claim 17 wherein said predetermined amount is amount sufficient to maintain a margin between said engine target speed (TARGET_NE) and said engine speed limit (NE_LIMIT) that indicates an overrev condition will occur when a transmission main shaft is re-engaged to an engine output shaft through a clutch.

19. The engine control method of claim 17 wherein said automatically increasing engine speed (NE) occurs only while a clutch is disengaged.

20. The engine control method of claim 19 further including:
 detecting whether a clutch pedal of said clutch is depressed beyond a predetermined amount, said clutch pedal being depressed beyond said predetermined amount indicative of said clutch being disengaged.

21. The engine control method of claim 17 wherein said automatically increasing said engine speed (NE) includes opening a throttle a corresponding amount or commanding an IMA motor to increase engine speed (NE).

* * * * *